United States Patent [19]
Nishimura

[11] Patent Number: 6,131,014
[45] Date of Patent: Oct. 10, 2000

[54] BIDIRECTIONAL COMMUNICATION SYSTEM AND UPSTREAM COMMUNICATION NOISE LEVEL DETERMINATION METHOD

[75] Inventor: Masayuki Nishimura, Kawasaki, Japan

[73] Assignee: Fujitsu Limited, Kanagawa, Japan

[21] Appl. No.: 09/170,662

[22] Filed: Oct. 13, 1998

[30] Foreign Application Priority Data

Mar. 17, 1998 [JP] Japan .................................. 10-066338

[51] Int. Cl.$^7$ ................................................. H04B 17/00
[52] U.S. Cl. ....................................... 455/67.3; 455/226.2
[58] Field of Search .................................. 455/67.1, 67.3, 455/67.4, 423, 226.1, 226.2, 226.3

[56] References Cited

U.S. PATENT DOCUMENTS

| | | | |
|---|---|---|---|
| 5,450,623 | 9/1995 | Yokoyama et al. | 455/67.3 |
| 5,613,232 | 3/1997 | Toshida et al. | 455/226.2 |
| 5,721,754 | 2/1998 | Chen | 455/67.3 |
| 6,011,963 | 1/2000 | Ogoro | 455/226.2 |

FOREIGN PATENT DOCUMENTS

6-245212  9/1994  Japan .

*Primary Examiner*—Nay Maung
*Assistant Examiner*—Quochien B. Vuong
*Attorney, Agent, or Firm*—Helfgott & Karas, P.C.

[57] ABSTRACT

To measure noise level of a signal for upstream communication during bidirectional communication and to maintain a constant quality for the upstream signal, it is provided a bidirectional communication system between a center unit and terminals comprising: a reference pattern signal generator for generating a reference pattern signal; a level controller for controlling the transmission level of the reference pattern signal; a transmitter for transmitting a plurality of the reference pattern signals having different transmission levels to the center unit; a receiver, provided in the center unit, for receiving the reference pattern signals; a level measurer for measuring the reception levels of the received reference pattern signals; and a noise level determiner for determining a noise level in the reception levels in accordance with the measured result obtained by the level measurer. The level controller changes the transmission level of the reference pattern signals step by step. The noise level determiner determines, as a noise level, a level which is one step lower than the lowest reception level measurable by the level measurer.

10 Claims, 10 Drawing Sheets

BIDIRECTIONAL COMMUNICATION SYSTEM AND UPSTREAM COMMUNICATION NOISE LEVEL DETERMINATION METHOD

BACKGROUND OF THE INVENTION

1. Field of the Invention

The present invention relates to a bidirectional communication system employing a cable, such as for CATV (cable television), and in particular to an upstream communication noise level determination method for a bidirectional communication system.

2. Related Arts

Figure 7:
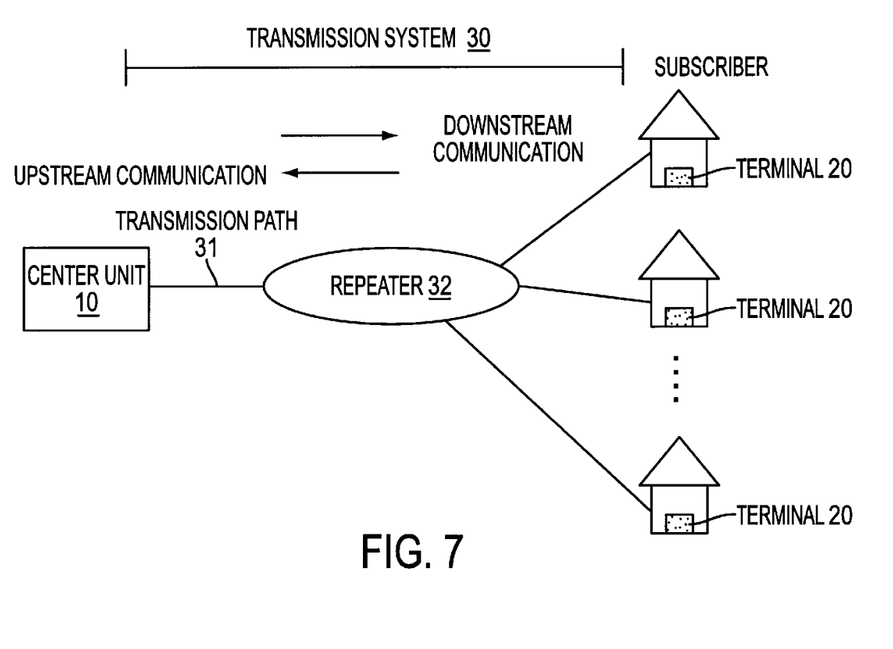
FIG. 7 is a diagram showing the basic arrangement of a CATV (cable television) system.

FIG. 7 is a diagram illustrating the basic arrangement for CATV (cable television), which is an example bidirectional communication system. In FIG. 7, the CATV system comprises: a center unit 10, which is a CATV station; terminals 20, provided for a plurality of CATV subscribers; and a transmission system 30, for connecting the center unit 10 and the terminals 20. The transmission system 30 includes a transmission path 31 constituted, for example, by an optical fiber or a coaxial cable, and a repeater 32 for amplifying a signal sent across the transmission path. When an optical fiber is used as one part of the transmission path 31, a photoelectric converter is connected to each of its ends.

Figure 8:
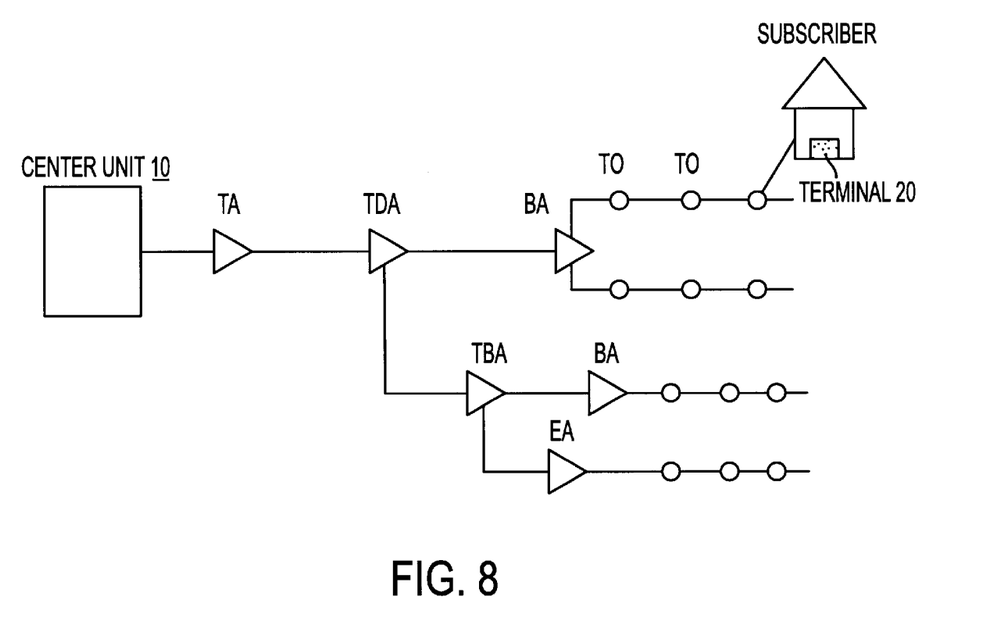
FIG. 8 is a diagram showing an example structure for a repeater.
Figure 9A:
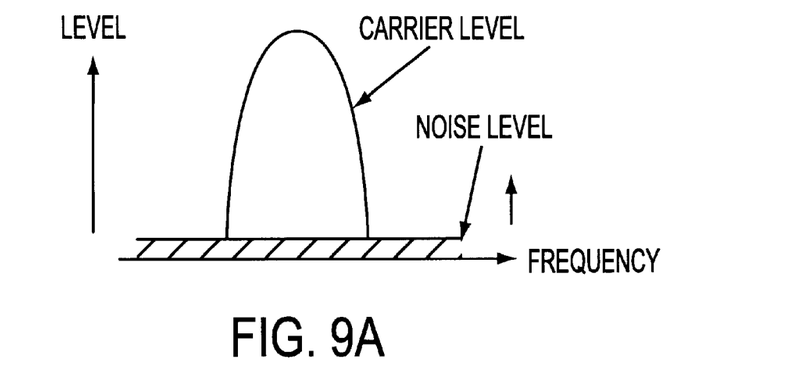
FIG. 9 is a specific diagram showing a carrier level and a noise level.
Figure 9B:
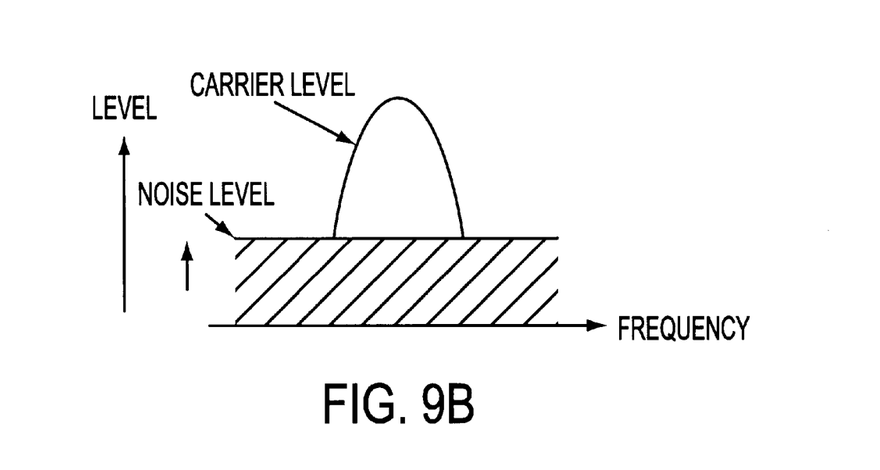
Figure 9C:
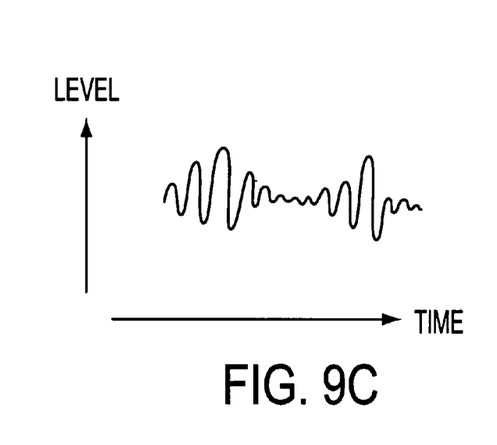
Figure 9D:
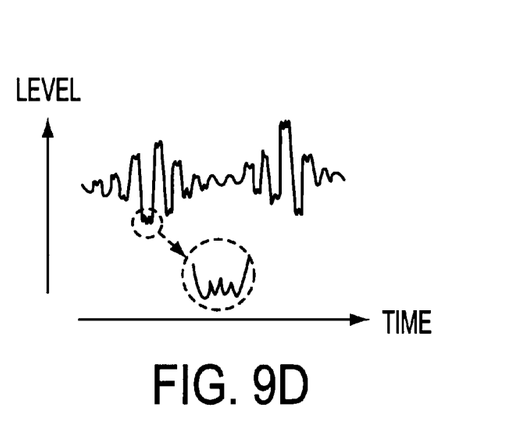

FIG. 8 is a diagram illustrating an example arrangement for the repeater 32. The repeater 32 comprises a trunk amplifier (TA), a trunk distribution amplifier (TDA), a trunk branch amplifier (TBA), a branch amplifier (BA), an extension amplifier (EA), and distributors (tap-offs: TOs). The function of the amplifiers is the amplification of signals transmitted across the transmission path 31, and the function of the tap-offs is the diversion of signals on the transmission path 31 to the terminals 20 of the subscribers.

In the arrangement shown in FIGS. 7 and 8, for example, a band of 70 MHz to 770 MHz is employed as the transmission band for downstream communication from the center unit 10 to the terminals 20, and a band of 10 MHz to 50 MHz is employed as the transmission band for upstream communication from the terminals 20 to the center unit 10. Normally, for allocation purposes, the television signal channels are divided by bands of 6 MHz, one of which is provided for each channel.

For the downstream communication stage of conventional bidirectional communication, a signal having a predetermined level is transmitted from the center unit 10 to the terminals 20. For the upstream communication stage, the transmission level at the terminals 20 is adjusted so as to maintain a constant reception level at the center unit 10. Generally, the signal level is attenuated by a transmission loss across the transmission path 31 and the repeater 32. The level of the transmission loss differs with the lengths of the transmission paths 31, which extend from the individual terminals 20 to the center unit 10, or with the number of the repeaters which are provided. Therefore, during the upstream communication stage the transmission signal levels at the individual terminals 20 vary in accordance with the level of the transmission loss in order to maintain a constant reception level at the center unit 10.

In addition, in order to maintain a constant signal communication quality, signals received by the center unit 10 and by the terminals 20 must satisfy a predetermined C/N value which is a ratio of a signal carrier level to a noise level.

FIG. 9 is a specific diagram showing a carrier level and a noise level. For examples (A) and (B) in FIG. 9, the horizontal axis represents a frequency and the vertical axis represents a level. For examples (C) and (D) in FIG. 9, the horizontal axis represents time and the vertical axis represents a level. When, as is shown in example (A), the noise level is low relative to the carrier level (the C/N value is high), almost no noise element appears in the carrier, as is shown in example (C).

However, when, as is shown in (B), the noise level is high relative to the carrier level (the C/N value is low), the noise element which appears in the carrier as is shown in (D) is regarded as a signal element, which may cause a demodulation error and result in data being obtained that differ from the original data. As the noise level is high, the noise element is increased and the probability that a conversion error will occur is also increased.

The noise which occurs in the transmission system 30, such as along the transmission path 31 and the repeater 32, is transmitted with a downstream signal to the terminals 20 during the downstream communication stage, or is transmitted with an upstream signal to the center unit 10 during the upstream communication stage. In the downstream communication stage, since the center unit 10 and the terminals 20 have a one-to-one correspondence and only one route is provided for the downstream signal for each terminal 20, the noise carried by the downstream signal received by the terminals 20 is not increased.

In the upstream communication stage, however, since the upstream signals from the terminals 20 are collectively transmitted to the center unit 10, the noise levels of the individual signals are superimposed (joined), and the final transmitted noise level is increased considerably. This noise is, for example, noise which is produced by the terminals 20 and the repeater 32 themselves, or an external noise resulting from the inadequate securing of a connector (not shown) for connecting the transmission path 31 and the repeater 32, or by the loosening of a connector that may occur as time elapses. Various noise factors are present in the communication system.

Figure 10:
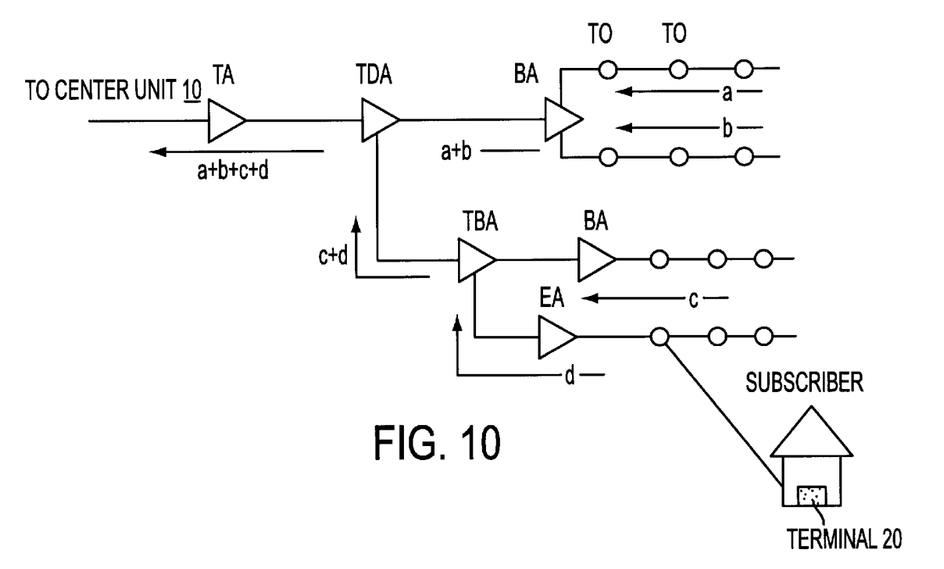
FIG. 10 is a conceptual diagram of the convergence of noise during upstream communication.

FIG. 10 is a conceptual diagram of the convergence of noise during the upstream communication stage. In FIG. 10, upstream signals (a, b, c and d) transmitted by the individual terminals 20 are synthesized when they pass through a repeater 32, which has a branch function, and a synthesized upstream signal (a+b+c+d) is obtained which is carried along the transmission path 31 and is finally received by the center unit 10. The noise levels carried by the upstream signals (a, b, c and d) are superimposed on each other when the upstream signals are synthesized.

As a result, when the upstream signal is received by the center unit 10 in the upstream communication stage, the C/N value is considerably greater than the C/N value of the downstream signal received by each terminal 20 in the downstream communication stage. Therefore, in order to maintain a constant or higher quality for the upstream signal which is received by the center unit 10 in the upstream communication stage, the levels for the upstream signals transmitted by the terminals 20 must be set by measuring the noise levels, so that the C/N value of the signals is equal to or higher than a predetermined value.

Furthermore, since more transmission paths 31 are required as the number of CATV subscribers is increased and the communication service is expanded, or since the transmission path 31 and the repeater 32 may deteriorate due to the elapse of time, the noise level of the signal is increased and the quality of the signal is deteriorated.

Conventionally, however, the noise level included in the signal in the upstream communication stage is not measured, and no countermeasure is employed for the time-transient deterioration of the noise level.

SUMMARY OF THE INVENTION

It is, therefore, one objective of the present invention to provide a bidirectional communication system which can measure the noise level of a signal for upstream communication during bidirectional communication and which can maintain a constant quality for the upstream signal.

To achieve the above objective of the present invention, according to the present invention a bidirectional communication system between a center unit and terminals comprises:

a reference pattern signal generator for generating a reference pattern signal;

a level controller for controlling the transmission level of the reference pattern signal;

a transmitter for transmitting a plurality of the reference pattern signals having different transmission levels to the center unit;

a receiver, provided in the center unit, for receiving the reference pattern signals;

a level measurer for measuring the reception levels of the received reference pattern signals; and a noise level determiner for determining a noise level in the reception levels in accordance with the measured result obtained by the level measurer.

The level controller step by step changes the transmission level of the reference pattern signals for which the waveform and the transmission level are determined in advance. The noise level determiner determines, as a noise level, a level which is one step lower than the lowest reception level measurable by the level measurer.

As is described above, the noise level can be obtained by measuring the reception level for the reference pattern signal, for which the waveform pattern and the transmission level have previously been determined.

Furthermore, since the noise level determiner, based on the determined noise level, notifies the terminals of the transmission level to be used for upstream signals, which are to be transmitted by the terminals, the center unit can receive from the terminals upstream signals that have a predetermined communication quality and a constant reception level.

The reference pattern generator, the level controller and the transmitter may be provided in the individual terminals or as separate units. Further, it is preferable that the receiver, the level measurer and the noise level determiner be provided in the center unit.

Other features and advantages of the present invention will become readily apparent from the following description when taken in conjunction with the accompanying drawings.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
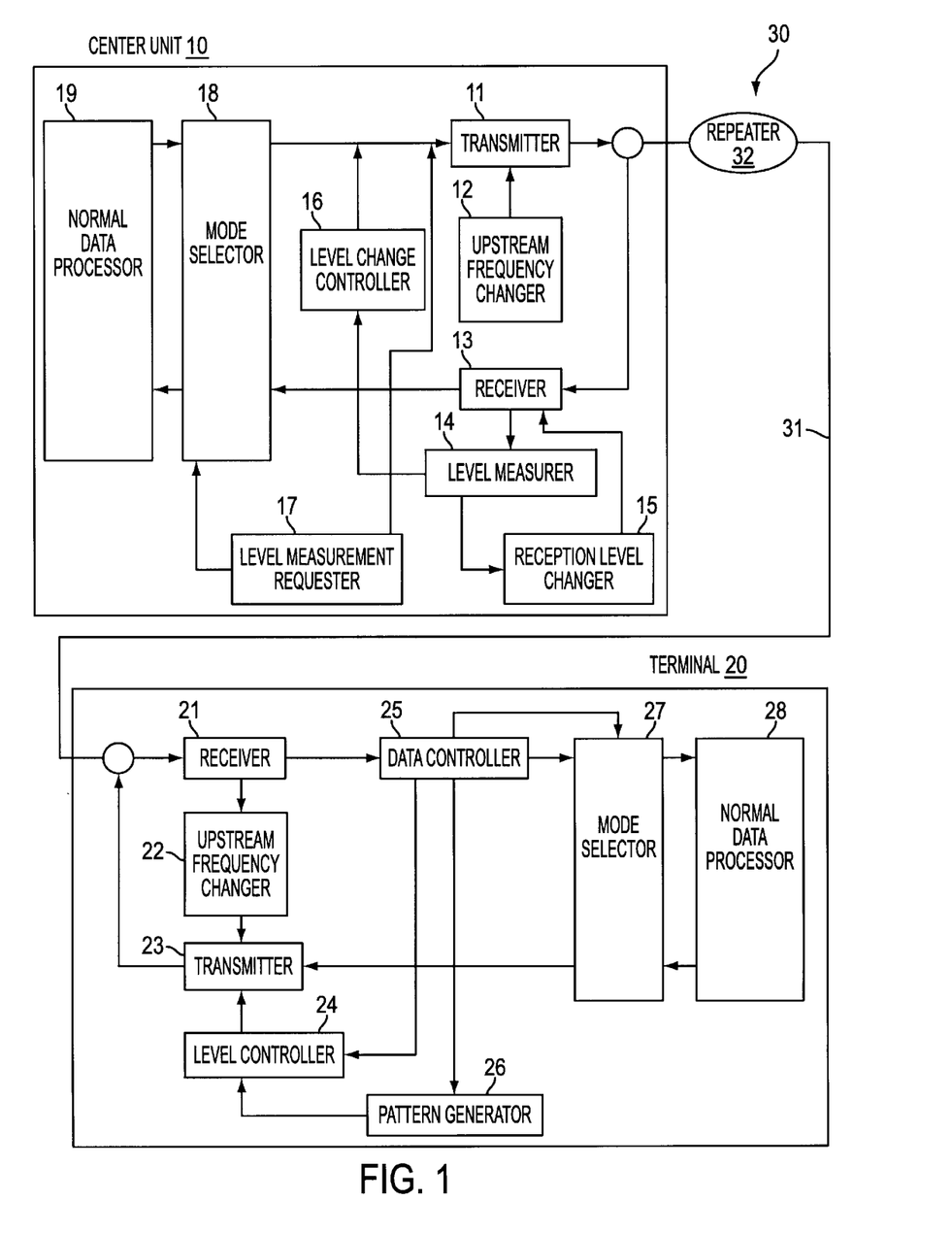
FIG. 1 is a diagram illustrating the arrangement of a bidirectional communication system according to one embodiment of the present invention.

FIG. 1 is a diagram illustrating the arrangement of a bidirectional communication system according to one embodiment of the present invention. In FIG. 1 the bidirectional communication system comprises, as does the system in FIG. 7, a center unit 10, terminals 20 and a transmission system 30. The transmission system 30, as in FIGS. 7 and 8, comprises a transmission path 31 and a repeater 32. The individual components of the center unit 10 and the terminals 20 will be described later.

In this embodiment, a pattern generator for generating a reference pattern signal is provided for at least one of the terminals 20. A noise level is determined by measuring the lowest reception level at which the center unit 10 can receive the reference pattern signals from the terminals 20.

Figure 2:
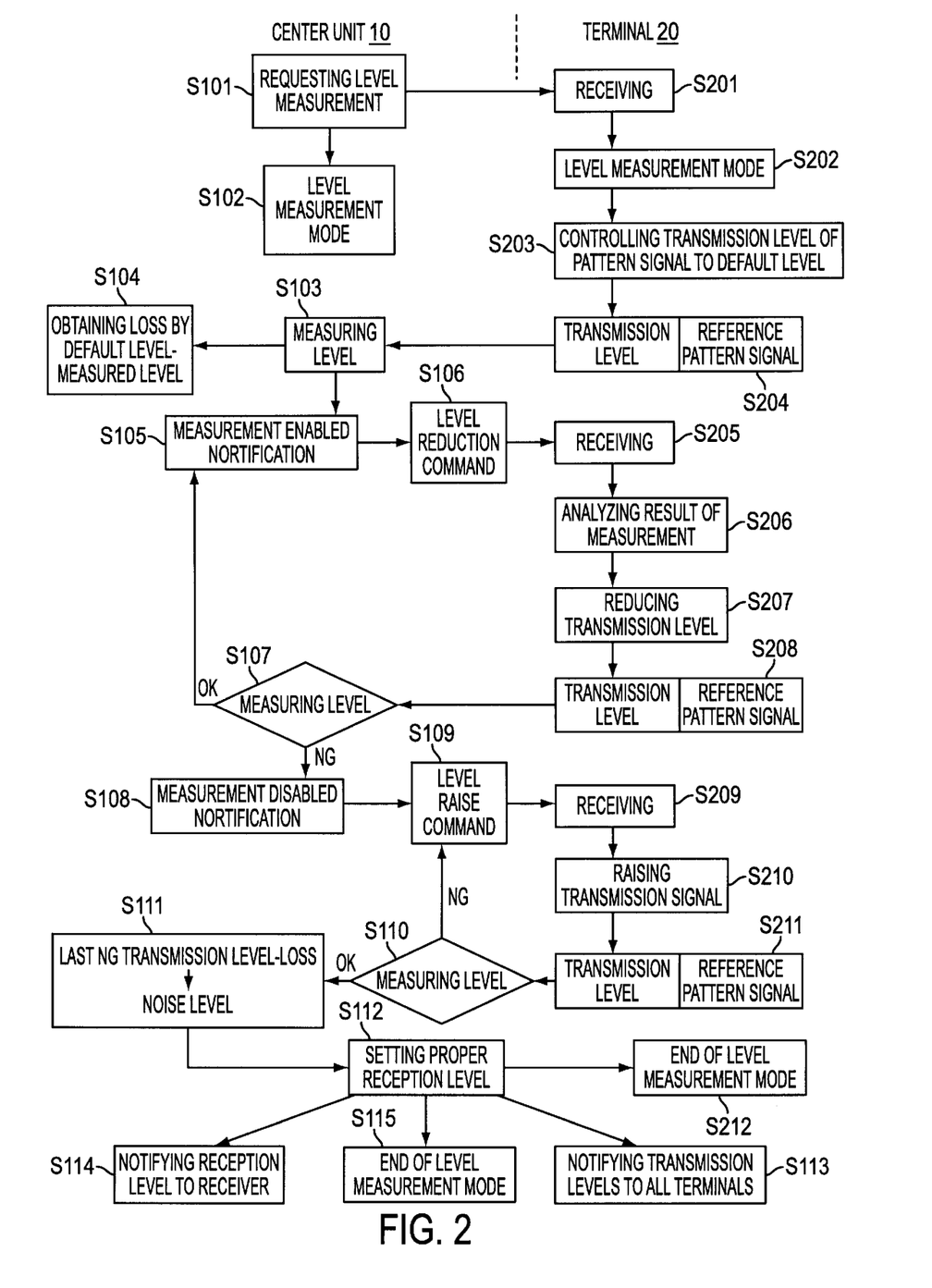
FIG. 2 is a flowchart showing noise level measurement processing according to the embodiment of the present invention.

FIG. 2 is a flowchart showing noise level measurement processing in this embodiment. The embodiment will be described in more detail while referring to the individual components in FIG. 1 and the steps in FIG. 2.

At step S101 a level measurement requester 17 in the center unit 10 issues a level measurement request to the terminals 20. A mode selector 18 changes the center unit 10 from the normal operating mode for the transmission of data to a level measurement mode (step S102). When this mode switching is effected, a normal data processor 19 interrupts the processing of data.

A level measurement request signal is transmitted by a transmitter 11 in the center unit 10 to receivers 21 in the terminals 20 (step S201). The level measurement request signal is analyzed by data controllers 25, and the results of the analysis are transmitted to mode selectors 27 and pattern generators 26. The terminals 20, as is the center unit 10, are changed from the normal data processing mode to a level measurement mode by the mode selectors 27 (step S202). When this mode switching is effected, normal data processors 28 interrupt the processing of data.

The pattern generators 26 generate predetermined reference pattern signals, and level controllers 24 adjust the transmission levels of the reference pattern signals to a predetermined default level (step S203). The reference pattern signals with the default level are transmitted by transmitters 23 (step S204). Also transmitted at this time are transmission level signals carrying information for the transmission level of the reference pattern signals.

The reference pattern signals from the terminals 20 are received by a receiver 13 in the center unit 10, and their reception levels are measured by a level measurer 14 (step S103). Since the level measurer 14 identifies a reference pattern in advance, it can measure only the reception levels of the reference pattern signals. Differences between the default level and the reception levels are obtained as a transmission loss between the center unit 10 and the terminals 20 (step S104).

The obtained reception level is transmitted as a measurement enabled (OK) notification to a level changer 16 (step S105). Upon receiving the notification, the level changer 16 permits the transmitter 11 to transmit to the terminals 20 a command signal for the reduction of the transmission levels at the terminals 20 (step S106).

When the receivers 21 of the terminals 20 receive the transmission level reduction command (step S205), the data controllers 25 analyze the results of the measurements made at the reception level, which are obtained by the center unit 10 and which are included in the transmission level reduction command (step S206). The data controllers 25 then reduce the transmission levels by a predetermined width (step S207).

The reference pattern signals are again generated by the pattern generators 26, their transmission levels are changed by the level controller 24 to a levels lower than the default level, and the resultant reference pattern signals are transmitted by the transmitters 23 (step S208). The transmission level signals to be transmitted with the reference pattern signals are maintained at the default level.

The reference pattern signals re-transmitted by the terminals 20 are again received by the receiver 13 of the center unit 10, and their its reception levels are measured by the level measurer 14 (step S107). When the measurements of the reception levels made by the level measurer 14 are available, a notification indicating that the measurement of the reception levels has been enabled is transmitted to the level changer 16 (step S105). The level changer 16 again transmits the transmission level reduction command from the transmitter 11 (step S106). As well as at steps S205 to S208, reference pattern signals for which the transmission levels have been reduced by a predetermined width are transmitted by the terminals 20. As the above processing is repeated, the transmission levels of the reference pattern signals are gradually lowered. When the reception levels of the reference pattern signals are lower than is the noise level, at step S107 the level measurer 14 can not measure the reception levels of the reference pattern signals.

When the level measurer 14 can not measure the reception levels of the reference pattern signals, a measurement disabled notification is transmitted to the level changer 16 (step S108). Upon receiving this notification, the level changer 16 transmits from the transmitter 11 to the terminals 20 a command signal directing the raising of the transmission levels (step S109). When the receivers 21 of the terminals 20 receive the transmission level raise command (step S209), the data controllers 25 increase the transmission levels and again transit the reference pattern signals (step S210). At this time, the width of the raise for the transmission levels is set smaller than the width of the reduction for the transmission levels. When, for example, the width of the reduction for the transmission levels is 10 dB (decibel), the width of the increase is 2 dB.

In this manner, the reference pattern signals are generated by the pattern generators 26, their transmission levels are raised a predetermined width from the previous level by the level controllers 24, and the resultant pattern signals are transmitted by the transmitters 23 (step S211).

When, at step S110, the reception levels of the reference pattern signals still can not be measured by the level measurer 14 in the center unit 10, the processing at steps S108, S109 and S209 to S211 is repeated until the reception levels of the signals can be measured by the level measurer 14.

When at step S110 the reception levels are measured by the level measurer 14, the measurement enabled notification is transmitted to the level changer 16. Upon receipt of the notification, the level changer 16 calculates, as a noise level, a difference between the last transmission level whereat the measurement was disabled, i.e., the transmission level at the preceding measurement, and the transmission loss obtained at step S104 (step S111).

When the noise level is obtained, the reception level at the center unit 10 is set so that it satisfies a predetermined C/N value (step S112). This reception level is acquired by adding the obtained noise level to the predetermined C/N value. The level changer 16 notifies all the terminals 20 of the transmission level for each terminal 20 so that the setup reception level can be established at the center unit 10 (step S113). In other words, the transmission levels at each of the terminals 20 is a value obtained by adding the levels of the transmission losses between the center unit 10 and each terminal 20 to the setup reception level which is the total of the noise level and the C/N value. It is preferable that the setup reception level and the transmission level be those at which a level change affected by an error rate can be absorbed to a degree.

Furthermore, when the measured noise level is changed, a reception level changer 15 in the center unit 10 notifies the receiver 13 of the alteration of the reception level (step S114).

When the notification of the transmission level has been transmitted to the terminals 20, the center unit 10 terminates the level measurement mode and returns to the normal operating mode (step S115). At this time, the terminals 20 also terminate the level measurement mode and return to the normal operating mode (step S212).

Figure 3:
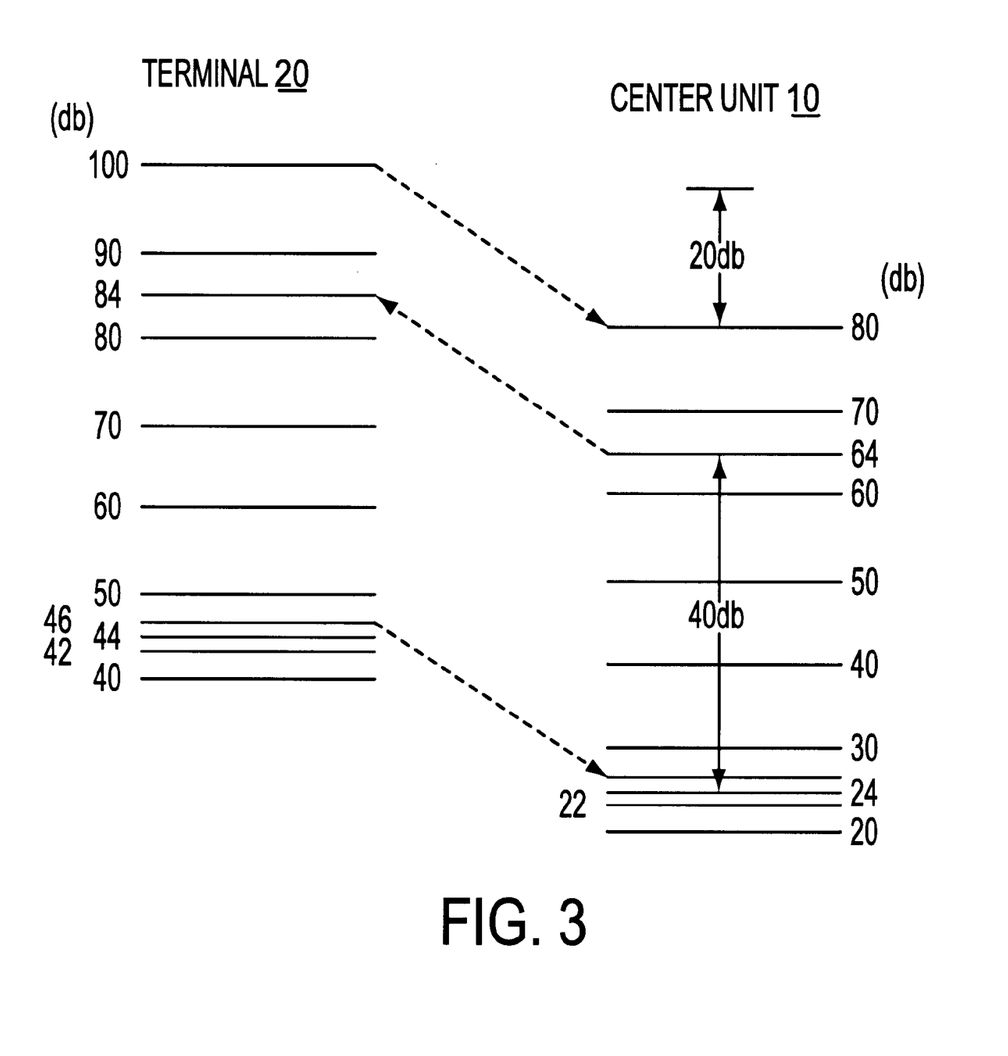
FIG. 3 is a diagram for explaining a transmission level, a reception level and a noise level.

The above embodiment will be further explained using specific values while referring to FIG. 3. FIG. 3 is a diagram showing the relationship between the transmission levels at a terminal 20 and the reception level at the center unit 10. In FIG. 3, assume that the default level of the reference pattern signal transmitted by the terminal 20 is 100 dB and that the reception level at the center unit 10 is 80 dB. The level of the transmission loss between the terminal 20 and the center unit 10, which is calculated at step S104, is 20 dB. Then, the transmission level of the reference pattern signal is reduced by 10 dB, and the resultant pattern signal is transmitted by the terminal 20. That is, reference pattern signals of 90 dB, 80 dB, 70 dB, 60 dB and 50 dB are transmitted by the terminal 20. The corresponding reception levels are 70 dB, 60 dB, 50 dB, 40 dB and 30 dB.

Assume that, when the reference pattern signal of 40 dB is transmitted by the terminal 20, at step S107 the level measurer 14 of the center unit 10 can not measure the reception level of the reference pattern signal.

Then, the transmission level is raised by a width (e.g., 2 dB) which is smaller than the width (10 dB) for reducing the transmission level. Therefore, a reference pattern signal of 42 dB is transmitted by the terminal 20. However, when the level measurer 14 of the center unit 10 still can not measure the reception level of the reference pattern signal, its transmission level is further raised to 44 dB and 46 dB. Then, assume that when the transmission level of the reference pattern signal is 46 dB, at step S110 the level measurer of the center unit 10 can measure the reception level. The level changer 16 determines that the noise level is 24 dB, which is the difference between the transmission loss level 20 dB and the last transmission level 44 dB at which the level measurer could not measure the reception level.

When the requested C/N value is, for example, 44 dB, the reception level required at the receiver 13 of the center unit 10 is 64 dB. In addition, the transmission level, which is required by the center unit 10 to ensure the reception level of 64 dB, at the terminal 20 is 84 dB, which is obtained by adding to 64 dB the transmission loss level of 20 dB.

The widths for raising and reducing the transmission level are not limited to the above values, and smaller widths, for example, may be employed.

In the above embodiment, the pattern generator 26 for generating a reference pattern signal is provided in a terminal 20. However, a device for level measurement which includes components required for measuring noise level, such as a pattern generator 26, a transmitter 24 and a level controller 24, may be provided separately from the terminal 20. This device for level measurement may also be provided at an arbitrary location in the transmission system 30.

Figure 4:
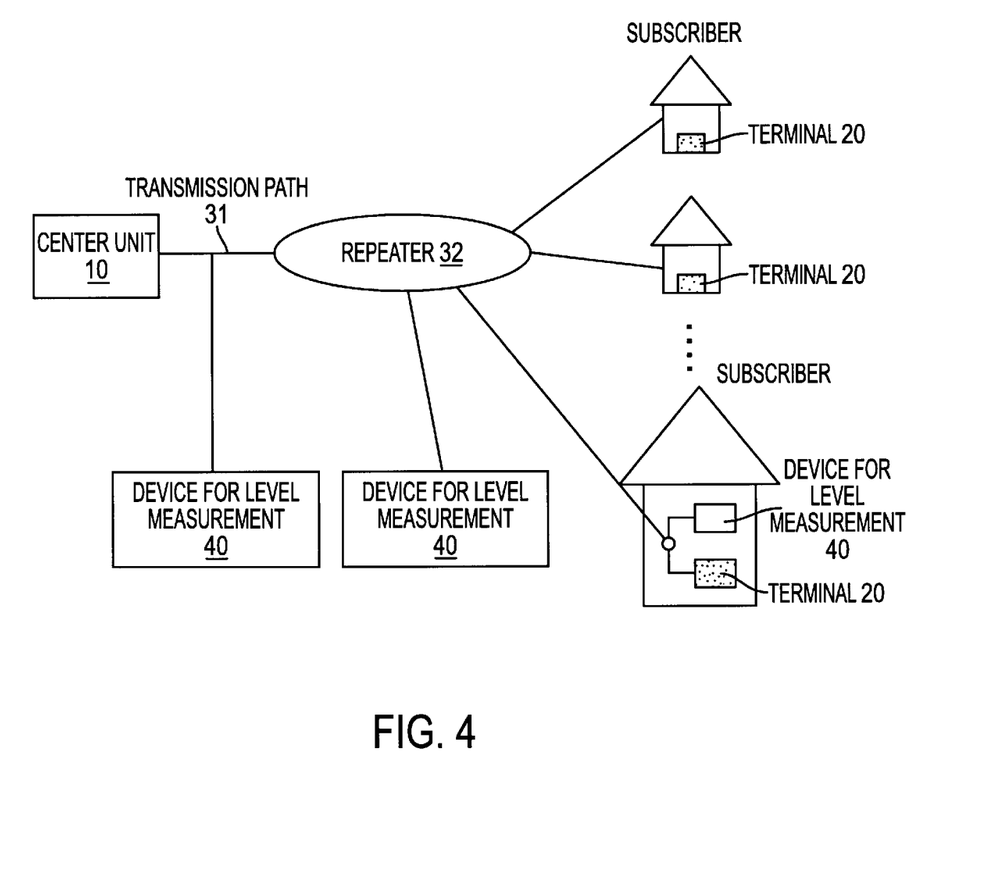
FIG. 4 is a diagram showing an example installation for a level measurer.

FIG. 4 is a diagram showing an example installation of a device for level measurement 40 for a bidirectional communication system. As is shown in FIG. 4, the device for level measurement 40 can be installed in a terminal 20 and in a subscriber's house, or along the transmission path 31.

The noise level measurement process in this embodiment may be performed during a period in which the modes of the center unit 10 and the terminal 20 are changed to the level measurement mode and the normal data processing is interrupted, or may be performed during the data communication process.

Figure 5:
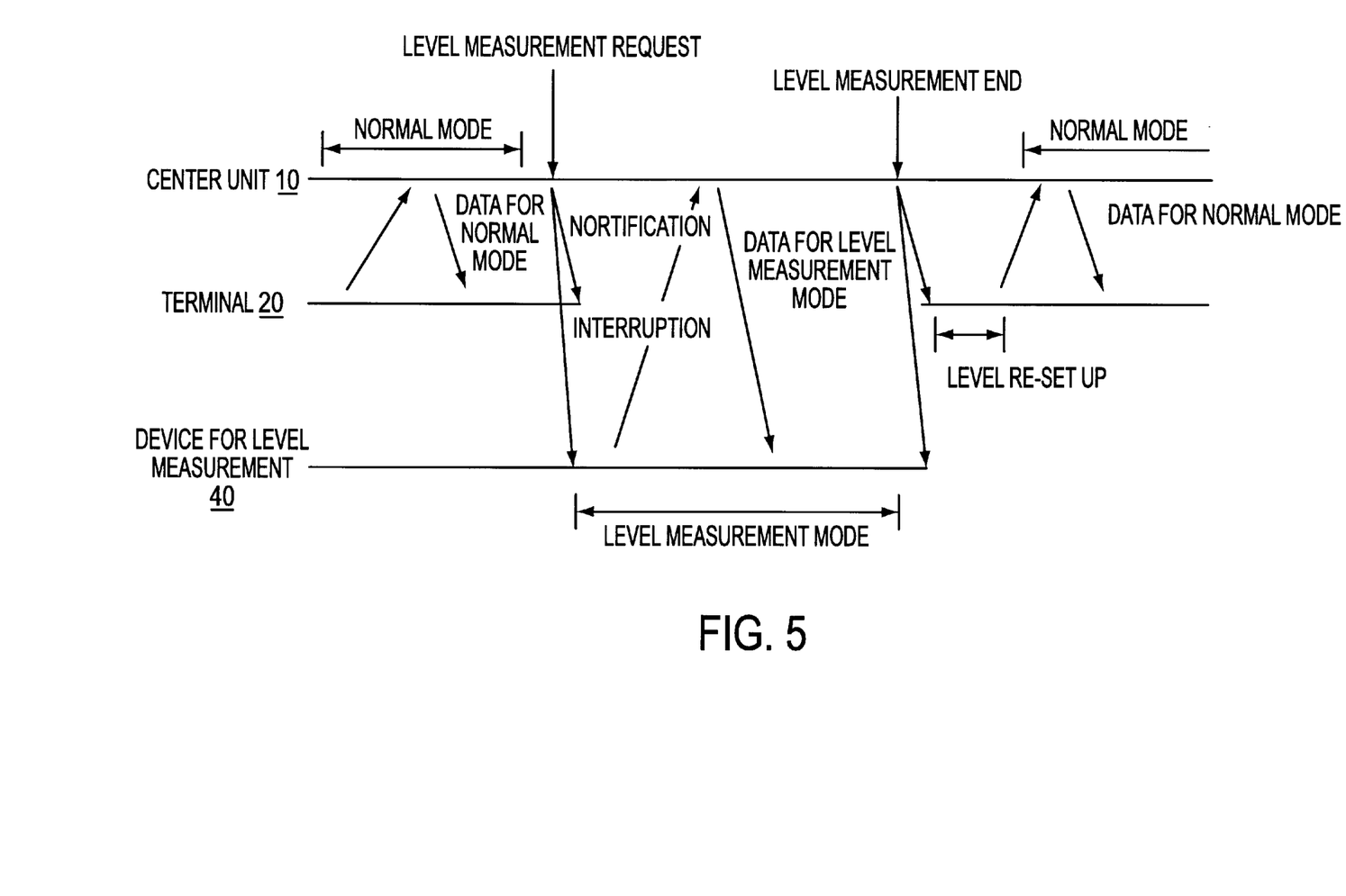
FIG. 5 is a diagram for explaining a level measurement mode.
Figure 6:
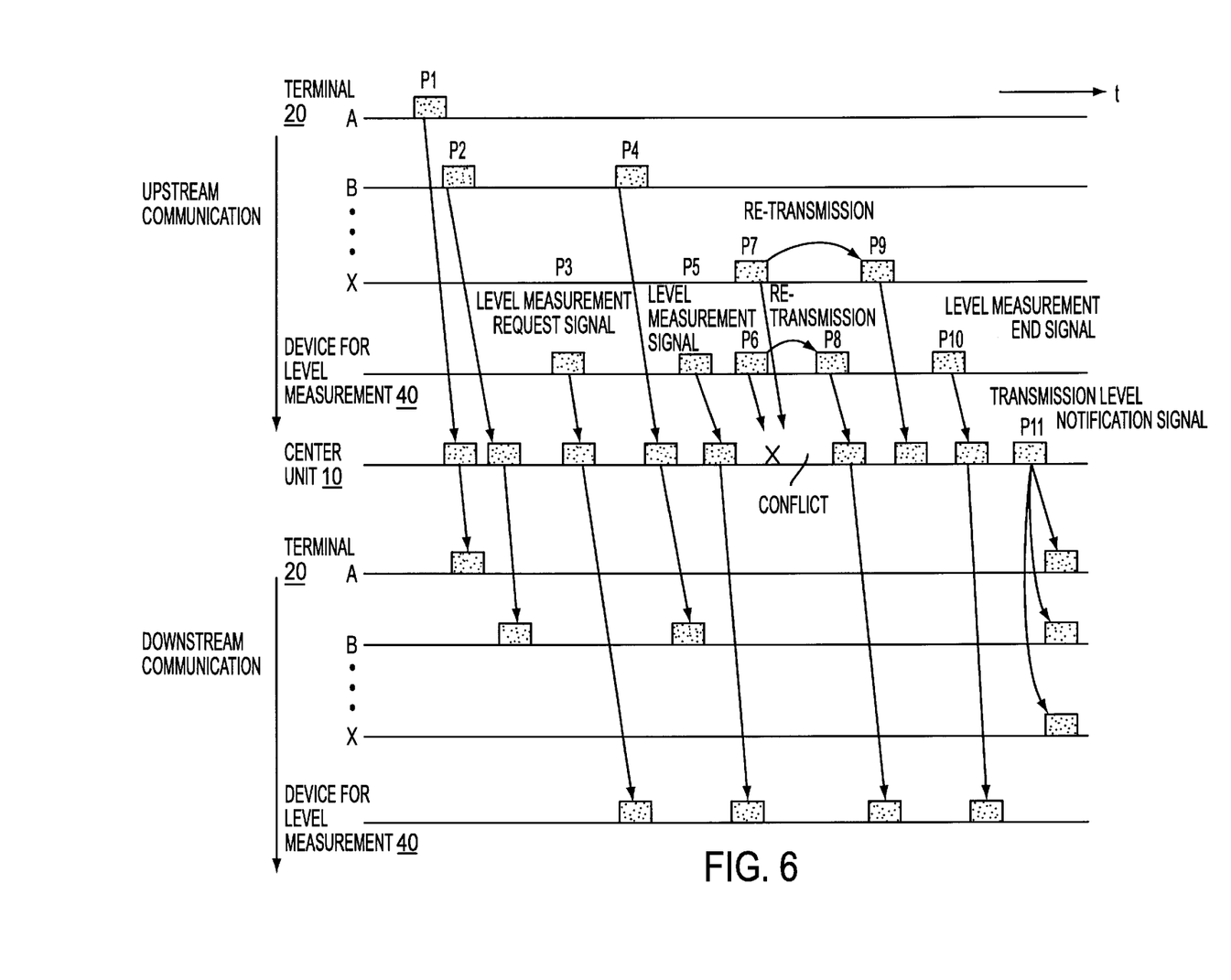
FIG. 6 is a time chart of the measurement of a noise level during normal communication when data are exchanged by a center unit and terminals.

FIG. 5 is a diagram for explaining the level measurement mode. In FIGS. 5 and 6, the device for level measurement 40 is provided separately from the terminal 20. In FIG. 5, normal data communication is performed between the center unit 10 and the terminal 20 in the normal operating mode. When the level measurement requester 17 of the center unit 10 issues a level measurement request, a level measurement request signal is transmitted to all the terminals 20, which in turn interrupt communication with the center unit 10. The device for level measurement 40 is changed to the level measurement mode and performs the above described noise level measurement processing. When the noise level is measured and the level measurement mode end signal is transmitted by the center unit 10, the terminals 20 are notified of the transmission level according to the obtained noise level, and the normal operating mode is restarted at the transmission level which is again set up.

Since the normal operating mode for normal data processing is temporarily interrupted and the noise level is measured, it is also possible to measure the noise level for an upstream frequency other than the frequency of an upstream signal which is used in the normal operating mode. The upstream frequency is changed by an upstream frequency changer 22 in the terminal 20 based on a change command issued by an upstream frequency changer 12 in the center unit 10 in FIG. 1.

FIG. 6 is a time chart for the measurement of noise level during normal communication when data are exchanged by the center unit 10 and the terminals 20. Generally, in this case by employing time-division multiple access (TDMA), the signals are exchanged in a time-division manner by the center unit 10, the terminals 20, and the level measurement unit 40. While data communication is being performed between the center unit 10 and the terminals 20 (A, B, . . . and X), as is indicated by signals P1, P2 and P4 in FIG. 6, the device for level measurement 40 transmits a level measurement request signal P3 to the center unit 10. The device for level measurement 40 also transmits the level measurement signal P5 to the center unit 10. The level measurement signal P5 is a general term for signals which are to be exchanged between the center unit 10 and the device for level measurement 40 in order to measure the noise level, and is, for example, the above described reference pattern signal. During the measurement of the noise level, normally the center unit 10 and the device for level measurement 40 do not exchange only a single level measurement signal P5, but instead exchange a plurality of level measurement signals, including another level measurement signal P6, which are employed to measure the noise level.

As is shown in FIG. 6, when the level measurement signal P6 and a data signal P7 from the terminal 20 (X) conflict at the center unit 10, they are re-transmitted with a delay inserted between them, as is indicated by signals P8 and P9. When a level measurement end signal P10 is transmitted to the center unit 10, the center unit 10 transmits to the terminals 20 a transmission level notification signal P11 based on the obtained noise level.

As is described above, when the measurement of the noise level is conducted in the normal operating mode for the normal data processing, the device for level measurement 40 outputs a level measurement request signal once a day, so that a change in the noise level which occurs during the daily data processing can be coped with.

As is described above, the bidirectional communication system according to the present invention can measure the noise level of upstream signals received by the center unit during the upstream communication stage. And since a constant reception level can be set for the center unit while taking the noise level into account, a communication environment having a constant quality can be provided, regardless of the convergence of the noise contained in the upstream signals in the upstream communication stage.

Further, a constant C/N value can be maintained even though the transmission paths are increased as the communication service is expanded, and even though the transmission path deteriorates as time elapses and the noise level at the repeater is increased. As a result, a high quality communication environment can be maintained.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A bidirectional communication system between a center unit and terminals comprising:
   a reference pattern signal generator for generating a reference pattern signal;
   a level controller for controlling the transmission level of the reference pattern signal;
   a transmitter for transmitting a plurality of the reference pattern signals having different transmission levels to the center unit;
   a receiver, provided in the center unit, for receiving the reference pattern signals;

a level measurer for measuring the reception levels of the received reference pattern signals; and a noise level determiner for determining a noise level in the reception levels in accordance with the measured result obtained by the level measurer.

2. The bidirectional communication system according to claim 1, wherein a device having the reference pattern signal generator, the level controller and the transmitter is provided in the terminal.

3. The bidirectional communication system according to claim 1, wherein the level controller changes the transmission levels of the reference pattern signals step by step and the noise level determiner determines that a noise level is a level which is one step lower than the lowest reception level measurable by the level measurer.

4. The bidirectional communication system according to claim 1, wherein the noise level determiner notifies the terminals levels of upstream signals from the terminals to the center unit based on the determined noise level.

5. The bidirectional communication system according to claim 1, wherein a frequency of the reference pattern signal is different from a frequency of upstream signals from terminals to the center unit.

6. A method for determining noise level of upstream communication from terminals to a center unit of bidirectional communication between the center unit and the terminals comprising the steps of:

generating a reference pattern signal;

transmitting a plurality of the reference pattern signals having different transmission levels to the center unit;

receiving the reference pattern signals in the center unit;

measuring the reception levels of the received reference pattern signals; and determining a noise level in the reception levels in accordance with the measured result obtained by the level measurer.

7. The method according to claim 6, wherein the transmission levels of the reference pattern signals are changed step by step and the noise level is determined as a level which is one step lower than the lowest reception level measurable by the level measurer.

8. The method according to claim 6, further comprising the step of notifying the terminals levels of upstream signals from the terminals to the center unit based on the determined noise level.

9. The method according to claim 6, wherein the steps are processed during interrupting normal communication between the center unit and the terminals.

10. The method according to claim 6, wherein the steps are processed during normal communication between the center unit and the terminals by using time division multiple access.

* * * * *